United States Patent [19]

Mahoney et al.

[11] Patent Number: 5,227,101
[45] Date of Patent: Jul. 13, 1993

[54] PROCESS OF MAKING MICROPOROUS MEMBRANES FROM POLY(ETHERETHERKETONE)-TYPE POLYMERS AND LOW MELTING POINT CRYSTALLIZABLE POLYMERS

[75] Inventors: Robert D. Mahoney, Danville; H. Nelson Beck, Walnut Creek; Richard A. Lundgard; Hawk S. Wan, both of Antioch; Jiro Kawamoto, Walnut Creek; Mark F. Sonnenschein, Antioch, all of Calif.

[73] Assignee: The Dow Chemical Company, Midland, Mich.

[21] Appl. No.: 633,600

[22] Filed: Dec. 21, 1990

Related U.S. Application Data

[63] Continuation-in-part of Ser. No. 380,058, Jul. 14, 1989, Pat. No. 5,064,580, which is a continuation-in-part of Ser. No. 175,716, Mar. 31, 1988, Pat. No. 4,904,426.

[51] Int. Cl.⁵ .................. B29C 35/00; B29C 67/20
[52] U.S. Cl. .................. 264/28; 210/500.27; 210/500.28; 264/41; 264/184; 264/203; 264/210.3; 264/210.4; 264/210.6; 264/211.14; 264/211.16; 264/211.19
[58] Field of Search ............ 264/41, 184, 203, 207.1, 264/211.14, 211.16, 211.19, 28, 210.3, 210.4, 210.6, 211.18, 211.2, 216, 235, 235.6, 346; 210/500.23, 500.27, 500.21, 500.28

[56] References Cited

U.S. PATENT DOCUMENTS

| | | | |
|---|---|---|---|
| 3,637,592 | 1/1972 | Berr | 260/47 R |
| 3,928,295 | 12/1975 | Rose | 260/79.3 M |
| 4,051,300 | 9/1977 | Klein et al. | 264/49 |
| 4,100,238 | 7/1978 | Shinomura | 264/49 |
| 4,118,363 | 10/1978 | Smith | 524/371 |
| 4,320,224 | 3/1982 | Rose et al. | 528/126 |
| 4,331,798 | 5/1982 | Stanilard | 528/371 |
| 4,377,481 | 3/1983 | Jakabhazy | 264/41 |
| 4,387,187 | 6/1983 | Newton | 525/409 |
| 4,419,486 | 12/1983 | Rose | 525/534 |
| 4,456,740 | 6/1984 | Holubka et al. | 525/528 |
| 4,540,684 | 9/1985 | Stoltefuss et al. | 514/32 |
| 4,664,681 | 5/1987 | Anazawa et al. | 264/176.1 |
| 4,678,833 | 7/1987 | McCreedy et al. | 525/66 |
| 4,711,945 | 12/1987 | Daniels | 528/219 |
| 4,714,725 | 12/1987 | Hendy et al. | 524/108 |
| 4,721,732 | 1/1988 | Dubrow et al. | 521/62 |
| 4,798,847 | 1/1989 | Roesink et al. | 521/50 |
| 4,804,472 | 2/1989 | Handlin, Jr. | 264/216 |
| 4,820,419 | 4/1989 | Hendy et al. | 210/651 |
| 4,882,223 | 11/1989 | Aptel et al. | 428/398 |
| 4,904,426 | 2/1990 | Lundgard et al. | 264/41 |
| 4,957,817 | 9/1990 | Chau et al. | 264/45.9 |
| 4,964,890 | 10/1990 | Reuter et al. | 55/158 |
| 5,064,580 | 11/1991 | Beck et al. | 264/41 |

FOREIGN PATENT DOCUMENTS

| | | |
|---|---|---|
| 2020845 | 1/1991 | Canada . |
| 0192408 | 8/1986 | European Pat. Off. . |
| 0254431 | 1/1988 | European Pat. Off. . |
| 297744 | 1/1989 | European Pat. Off. . |
| 409496 | 1/1991 | European Pat. Off. . |
| 3402471 | 8/1985 | Fed. Rep. of Germany . |
| T52404 | 7/1990 | Hungary . |
| 62-095104 | 5/1987 | Japan . |
| 2180790 | 4/1987 | United Kingdom . |

OTHER PUBLICATIONS

Jin et al., "A Sulphonated Poly(aryletherketone)," Department of Polymer Science and Engineering, University of Massachusetts, 1984.

Atwood et al., "Synthesis and Properties of Polyaryletherketones," *ACS Polymer Preprints*, 20(1), 1979, pp. 191–194.

Dr. Klaus Dahl (Raychem Corporation), "Heat Resistant Semicrystalline Poly(phenylene ether ketones): Melt Processable High Performance Polymers," *Industrial Affiliates Symposium on High Performance Polymers*, Departments of Chemistry and Chemical Engineering, Stanford University, Dec. 3–5, 1986.

Bishop et al., "Solubility and Properties of a Poly(aryl ether ketone) in Strong Acids," *Macromolecules*, vol. 18, American Chemical Society, 1985, pp. 86–93.

Lovinger et al., "Solution Crystallization of Poly(ether ketone)," *Macromolecules*, vol. 19, American Chemical Society, 1986, pp. 1861–1867.

Victrex PEEK Product Brochure, "A Guide to Grades For Injection Moulding," *ICI Advanced Materials*, 1986.

*Primary Examiner*—Leo B. Tentoni

[57] ABSTRACT

The invention relates to a process for preparing a microporous membrane from an unsulfonated poly(etheretherketone)-type polymer by forming a mixture of an unsulfonated poly(etheretherketone)-type polymer, a low melting point crystallizable polymer, and a plasticizer, heating the resulting mixture, extruding or casting the mixture into a membrane, quenching or coagulating the membrane, and leaching the membrane, while optionally drawing the membrane before, during, after leaching, or a combination thereof.

25 Claims, 1 Drawing Sheet

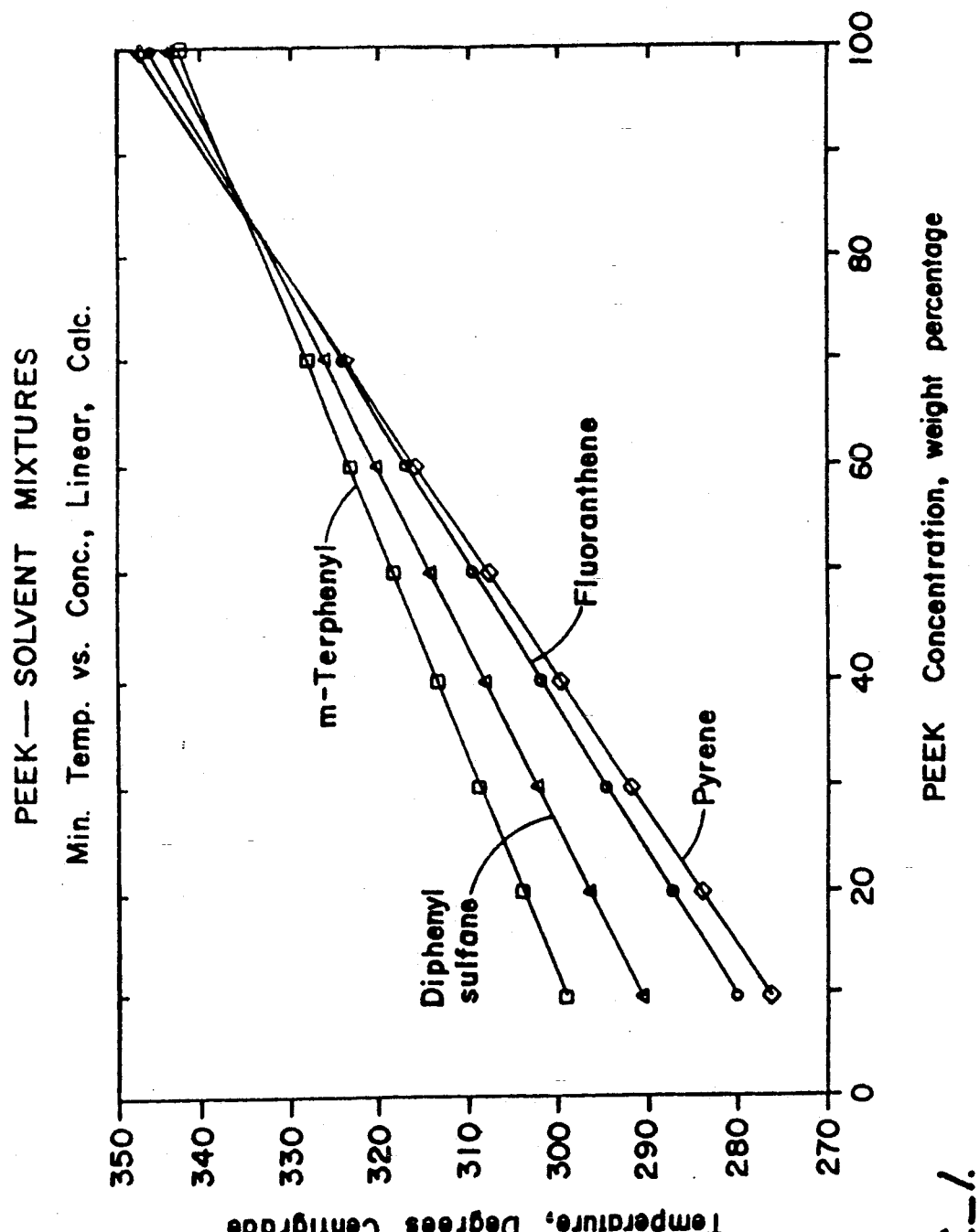
FIG._1.

PROCESS OF MAKING MICROPOROUS MEMBRANES FROM POLY(ETHERETHERKETONE)-TYPE POLYMERS AND LOW MELTING POINT CRYSTALLIZABLE POLYMERS

CROSS REFERENCE TO CO-PENDING PATENT APPLICATION

This application is a continuation-in-part of U.S. patent application Ser. No. 07/380,058, filed Jul. 14, 1989 now U.S. Pat. No. 5,064,580, which in turn is a continuation-in-part of U.S. patent application Ser. No. 175,716, filed Mar. 31, 1988, now U.S. Pat. No. 4,904,426.

BACKGROUND OF THE INVENTION

This invention relates to microporous membranes prepared from poly(etheretherketone)-type polymers and and low melting point crystallizable polymers, and a process for making the same. Such membranes are useful in the treatment of liquids by the membrane separation processes of ultrafiltration, microfiltration, macrofiltration, depth filtration, membrane distillation, and membrane stripping. The membranes of this invention are also useful as microporous supports for composite liquid or gas separation membranes.

In the past, microporous membranes have been fabricated from polyolefins such as polyethylene and polypropylene. One typical method of preparing such polyolefin membranes is by an extrusion process which involves dissolving the polyolefin in a solvent or a mixture of solvent and non-solvent, extruding the polyolefin/solvent/non-solvent mixture into membranes, and immersing the membranes into a leach bath. Another method of preparing such polyolefin membranes is by a melt-extrusion process which involves extruding the membranes from the molten polyolefin, followed by cold drawing the membranes. However, polyolefins, while inexpensive and easy to process, exhibit relatively low heat distortion temperatures.

Poly(etheretherketone)-type polymers are high performance thermoplastics which possess high glass transition temperatures, high crystalline melting points, high thermal stability, and high solvent resistance. Such properties make poly(etheretherketone)-type polymers useful for membranes employed in liquid separations, particularly membrane separation processes which involve treatment of organic, acidic, or basic liquids at elevated temperatures.

The very properties which make poly(etheretherketone)-type polymers desirable materials for use in applications which require high temperature and/or solvent resistance also render the polymers very difficult to process into membranes, particularly since poly(etheretherketone)-type polymers exhibit relatively low solution viscosities at membrane fabrication temperatures in excess of about 300° C. Furthermore, poly(etheretherketone)-type polymers are extremely solvent resistant and are therefore considered to be insoluble in all common solvents. Therefore, to form membranes, poly(etheretherketone), for example, is typically dissolved in very strong organic acids such as concentrated sulfuric acid to sulfonate the poly(etheretherketone), which renders the sulfonated poly(etheretherketone) soluble in common solvents such as dimethylformamide and dimethylacetamide. The problem associated with such a process is that the fabricated membrane comprises not poly(etheretherketone), but rather sulfonated poly(etheretherketone), which is soluble in common solvents. Thus, the high solvent resistance of poly(etheretherketone) is lost. Furthermore, sulfonated poly(etheretherketone) swells in aqueous solutions, which adversely affects membrane performance in aqueous separation applications.

What is needed is a process of preparing microporous membranes from poly(etheretherketone)-type polymers using plasticizers which do not chemically modify or degrade the poly(etheretherketone)-type polymer during fabrication so that the high strength, temperature resistance, and solvent resistance of the unsulfonated poly(etheretherketone)-type polymer is retained by the fabricated membranes. What is further needed is a method of increasing the solution viscosities of the poly(etheretherketone)-type polymers, so that membranes can be more easily fabricated at the high temperatures required for preparing membranes from such polymers.

SUMMARY OF THE INVENTION

The invention is a process for preparing a microporous membranes from an unsulfonated poly(etheretherketone)-type polymer comprising the steps of:

A. forming a mixture comprising:
  (i) at least one unsulfonated poly(etheretherketone)-type polymer,
  (ii) at least one low melting point crystallizable polymer which is at least partially incompatible with said poly(etheretherketone)-type polymer and which possesses a melting point of less than about (Tm - 30° C.), wherein Tm is the melting point of the poly(etheretherketone)-type polymer, and a molecular weight of at least about 400, and
  (iii) optionally, a plasticizer comprising at least one organic compound capable of dissolving at least about 10 weight percent of the poly(etheretherketone)-type polymer at the extrusion or casting temperature;

B. heating said mixture to a temperature at which said mixture becomes a fluid;

C. extruding or casting said fluid under conditions such that a membrane is formed;

D. optionally, quenching or coagulating said membrane by passing said membrane through at least one quench or coagulation zone under conditions such that said membrane solidifies; and E. optionally, leaching said membrane by passing said membrane through at least one leach zone under conditions such that at least a portion of said low melting point crystallizable polymer, at least a portion of said plasticizer for the unsulfonated poly(etheretherketone)-type polymer, or a combination thereof, is removed from said membrane; and F. optionally, before leaching, during leaching, after leaching, or a combination thereof, drawing said membrane to increase the flux of fluid through said membrane while said membrane is at a temperature above about 25° C. and below the crystalline melting point of the poly(etheretherketone)-type polymer or the depressed melting point of said mixture.

The membranes of this invention exhibit excellent solvent and temperature resistance. The membranes also possess high tensile strength. The membranes are useful as microporous membranes for liquid separations such as ultrafiltration, microfiltration, macrofiltration, depth filtration, membrane stripping, and membrane distillation and as microporous supports for composite liquid or gas separation membranes.

BRIEF DESCRIPTION OF THE DRAWING

FIG. 1 illustrates a composite of temperature at ambient pressure at which a specific weight percent of PEEK will dissolve in the solvents m-terphenyl, pyrene, fluoranthene, and diphenylsulfone.

DETAILED DESCRIPTION OF THE INVENTION

Poly(etheretherketone)-type polymers refer to polymers containing predominantly ether, —R—O—R—, and ketone, —R—CO—R—, linkages, wherein R is a divalent aromatic group. R is preferably a substituted or unsubstituted phenylene of Formula 1:

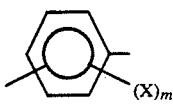

Formula 1 wherein
X is independently in each occurrence hydrogen, a $C_{1-4}$ alkyl, or a halogen; and
m is an integer between 0 and 4, inclusive.
X is preferably hydrogen, methyl, ethyl, chlorine, bromine, or fluorine.

Examples of preferred poly(etheretherketone)-type polymers within the scope of this invention include poly(etherketone) (PEK), poly(aryletherketone) (PAEK), poly(etheretherketone) (PEEK), poly(etherketoneketone) (PEKK), poly(etheretheretherketone) (PEEEK), poly(etheretherketoneketone) (PEEKK), poly(etherketoneetherketoneketone) (PEKEKK), and mixtures thereof.

An especially preferred poly(etheretherketone)-type polymer for use in this invention is PEEK, that is, poly(oxy-p-phenyleneoxy-p-phenylenecarbonyl-p-phenylene). PEEK is comprised of the repeat units described in Formula 2:

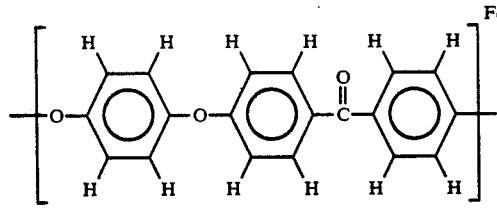

Formula 2

Another especially preferred poly(etheretherketone)-type polymer for use in this invention is PEK, that is, poly(oxy-1,4-phenylenecarbonyl-1,4-phenylene). PEK is comprised of the repeat units described in Formula 3:

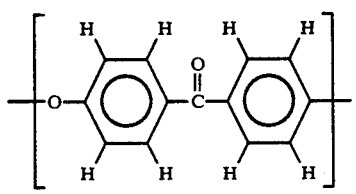

Formula 3

The poly(etheretherketone)-type polymers useful in this invention are unsulfonated. The poly(etheretherketone)-type polymers from which the membranes are fabricated preferably possess a degree of crystallinity of at least about 10 percent, more preferably of at least about 20 percent, even more preferably of at least about 30 percent, and a melting point of at least about 190° C., more preferably of at least about 250° C.

Commercially available PEEK, for example, VICTREX® PEEK 450 (®trademark of ICI Americas, Inc.), possesses a glass transition temperature of about 143° C. and a melting point of about 334° C. Such commercially available PEEK possesses a tensile strength of about 13,300 psi (ASTM Test Method D638), an elongation at break of about 50 percent (ASTM Test Method D638 at about 23° C. and test speed of about 0.2 in./min.), an ultimate shear strength of about 13,800 psi (ASTM Test Method D3846), a shear modulus of 188,500 psi (at about 23° C.), and a tensile modulus (1 percent secant) of about 522,100 psi (ASTM Test Method D638 at about 23° C.). The synthesis of such polymers is known in the art. See U.S. Pat. Nos. 4,320,224 and 4,331,798, the relevant portions relating to polymer synthesis incorporated herein by reference.

The low melting point crystallizable polymers useful in this invention are at least partially incompatible with the poly(etheretherketone)-type polymer. Partially incompatible as used herein means that the low melting point crystallizable polymer is at least partially immiscible and/or partially soluble with the poly(etheretherketone)-type polymer. Preferably the low melting point crystallizable polymer is substantially incompatible or immiscible with the poly(etheretherketone)-type polymer at about 25° C. Incompatibility or immiscibility of the low melting point crystallizable polymer with the poly(etheretherketone)-type polymer may be determined by methods known in the art. See *Polymer Blends*, Vol. 1, Academic Press, Inc., New York, N.Y., 1978, pp. 17–20 and Olabisi et al., *Polymer-Polymer Miscibility*, Academic Press, New York, N.Y., 1979, pp. 1–17; the relevant portions relating to definition of polymer blend immiscibility and incompatibility and the determination thereof incorporated herein by reference for all legal purposes served thereby.

The low melting point crystallizable polymers useful in this invention possess a melting point of less than about (Tm - 30° C.), preferably of less than about (Tm - 40° C.), more preferably of less than about (Tm - 50° C.); wherein Tm is the melting point of the poly(etheretherketone)-type polymer. The low melting point crystallizable polymers useful in this invention possess a melting point or a depressed melting point when mixed with the poly(etheretherketone)-type polymer or with the poly(etheretherketone)-type polymer and plasticizer, of preferably less than about 300° C., more preferably less than about 200° C., even more preferably of less than bout 100° C. The low melting point crystallizable polymers useful in this invention possess a molecular weight of at least about 400, preferably of at least about 500, more preferably of at least about 600.

Preferred low melting point crystallizable polymers include poly(caprolactones), poly(ethylene oxide), poly(ethylene glycol), poly(oxymethylene), poly(trimethylene oxide), poly(ethylene glycol)methylether, poly(vinyl alcohol), poly(vinyl chloride), crystalline cellulose esters, poly(caprolactone(diol)), and poly(caprolactone)triol. The polymers may contain hydroxy, amine, $C_{1-4}$ alkyl, and other end-blocking groups provided that such polymers are crystallizable and possess melting points or depressed melting points and molecular weights as hereinbefore described.

The optional plasticizers useful in this invention comprise at least one organic compound preferably capable of dissolving at least about 10 weight percent of the poly(etheretherketone)-type polymer present at the membrane fabrication temperature. The plasticizer more preferably dissolves at the fabrication temperature at least about 25 weight percent of the poly(etheretherketone)-type polymer and even more preferably about 50 weight percent of the poly(etheretherketone)-type polymer. The plasticizer may be comprised of at least one solvent for the poly(etheretherketone)-type polymer or a mixture of at least one solvent and at least one non-solvent for the poly(etheretherketone)-type polymer, provided the solvent/non-solvent mixture itself is capable of dissolving at least about 10 weight percent of the poly(etheretherketone)-type polymer at the membrane fabrication temperature. A solvent for the poly(etheretherketone)-type polymer dissolves at least about 10 weight percent poly(etheretherketone)-type polymer at the membrane fabrication temperature. A non-solvent for the poly(etheretherketone)-type polymer dissolves less than about 10 weight percent of the poly(etheretherketone)-type polymer at the membrane fabrication temperature.

A preferred class of solvents useful in this invention are organic compounds consisting predominantly of carbon and hydrogen and optionally oxygen, nitrogen, sulfur, halogen, and mixtures thereof, wherein the organic compound has a molecular weight of between about 160 and about 450, contains at least one six-membered aromatic ring structure, and possess a boiling point of between about 150° C. and about 480° C.

Preferred solvents useful in this invention include diphenic acid, N,N-diphenylformamide, benzil, anthracene, 1-phenylnaphthalene, 4-bromobiphenyl, 4-bromodiphenylether, benzophenone, 1-benzyl-2-pyrrolidinone, o,o'-biphenol, phenanthrene, triphenylmethanol, triphenylmethane, triphenylene, 1,2,3-triphenylbenzene, diphenylsulfone, 2,5-diphenyloxazole, 2-biphenylcarboxylic acid, 4-biphenylcarboxylic acid, m-terphenyl, 4-benzoylbiphenyl, 2-benzoylnaphthalene, 3-phenoxybenzyl alcohol, fluoranthene, 2,5-diphenyl-1,3,4-oxadiazole, 9-fluorenone, 1,2-dibenzoylbenzene, dibenzoylmethane, p-terphenyl, 4-phenylphenol, 4,4'-dibromobiphenyl, diphenylphthalate, 2,6-diphenylphenol, phenothiazine, 4,4'-dimethoxybenzophenone, 9,10-diphenylanthracene, pentachlorophenol, pyrene, 9,9'-bifluorene, a mixture of terphenyls, for example, SANTOWAX R ® mixed terphenyls (®trademark of the Monsanto Company), a mixture of partially hydrogenated terphenyls, for example, THERMINOL 66 ® partially hydrogenated terphenyls (®trademark of the Monsanto Company), a mixture of terphenyls and quaterphenyls, for example, THERMINOL 75 ® mixed terphenyls and quaterphenyls (trademark of the Monsanto Company), 1-phenyl-2-pyrrolidinone, 4,4'-isopropylidenediphenol, 4,4'-dihdroxybenzophenone, quaterphenyl, diphenyl terephthalate, 4,4'-dimethyldiphenylsulfone, 3,3',4,4'-tetramethyldiphenylsulfone, and mixtures thereof. Not all of these solvents are equally effective with all poly(etheretherketone)-type polymers. One of ordinary skill in the art can readily select the best solvent for a specific polymer empirically.

More preferred solvents include N,N-diphenylformamide, benzil, anthracene, 1-phenylnaphthalene, 4-bromobiphenyl, 4-bromodiphenyl ether, benzophenone, 1-benzyl-2-pyrrolidinone, o,o'-biphenol, phenanthrene, triphenylmethanol, triphenylmethane, triphenylene, 1,2,3-triphenylbenzene, diphenylsulfone, 2,5-diphenyloxazole, 2-biphenylcarboxylic acid, 4-biphenylcarboxylic acid, m-terphenyl, 4-benzoylbiphenyl, 2-benzoylnaphthalene, 3-phenoxybenzyl alcohol, fluoranthene, 2,5-diphenyl-1,3,4-oxadiazole, 9-fluorenone, 1,2-dibenzoylbenzene, dibenzoylmethane, p-terphenyl, 4-phenylphenol, 4,4'-dibromobiphenyl, diphenylphthalate, 2,6-diphenylphenol, phenothiazine, 4,4'-dimethoxybenzophenone, 9,10-diphenylanthracene, pentachlorophenol, pyrene, 9,9'-bifluorene, a mixture of terphenyls, for example, SANTOWAX R ® mixed terphenyls (®trademark of the Monsanto Company), a mixture of partially hydrogenated terphenyls, for example, THERMINOL 66 ® partially hydrogenated terphenyls (®trademark of the Monsanto Company), a mixture of terphenyls and quaterphenyls, for example, THERMINOL 66 ® mixed terphenyls and quaterphenyls (®trademark of the Monsanto Company), 1-phenyl-2-pyrrolidinone, 4,4'-isopropylidenediphenol, 4,4'-dihdroxybenzophenone, quaterphenyl, diphenyl terephthalate, 4,4'-dimethyldiphenylsulfone, 3,3',4,4'-tetramethyldiphenylsulfone, and mixtures thereof.

Even more preferred solvents include triphenylmethanol, triphenylmethane, triphenylene, 1,2,3-triphenylbenzene, diphenylsulfone, 2,5-diphenyloxazole, 2-biphenylcarboxylic acid, 4-biphenylcarboxylic acid, m-terphenyl, 4-benzoylbiphenyl, 2-benzoylnaphthalene, 3-phenoxybenzyl alcohol, fluoranthene, 2,5-diphenyl-1,3,4-oxadiazole, 9-fluorenone, 1,2-dibenzoyl benzene, dibenzoylmethane, p-terphenyl, 4-phenylphenol, 4,4'-dibromobiphenyl, diphenylphthalate, 2,6-diphenylphenol, phenothiazine, 4,4'-dimethoxybenzophenone, 9,10-diphenylanthracene, pentachlorophenol, pyrene, 9,9'-bifluorene, a mixture of terphenyls, for example, SANTOWAX R ® mixed terphenyls (®trademark of the Monsanto Company), a mixture of partially hydrogenated terphenyls, for example, THERMINOL 66 ® partially hydrogenated terphenyls (®trademark of the Monsanto Company), a mixture of terphenyls and quaterphenyls, for example, THERMINOL 75 ® mixed terphenyls and quaterphenyls (®trademark of the Monsanto Company), 1-phenyl-2-pyrrolidinone, 4,4'-isopropylidenediphenol, 4,4'-dihdroxybenzophenone, diphenyl terephthalate, 4,4'-dimethyldiphenylsulfone, 3,3',4,4'-tetramethyldiphenylsulfone, and mixtures thereof.

Especially preferred solvents include m-terphenyl, p-terphenyl, a mixture of terphenyls, for example, SANTOWAX R ® mixed terphenyls (®trademark of the Monsanto Company), a mixture of partially hydrogenated terphenyls, for example, THERMINOL 66 ® partially hydrogenated terphenyls (®trademark of the Monsanto Company), a mixture of terphenyls and quaterphenyls, for example, THERMINOL 75 ® mixed terphenyls and quaterphenyls (®trademark of the Monsanto Company), diphenylsulfone, and mixtures thereof.

A preferred class of non-solvents useful in this invention are organic compounds consisting predominantly of carbon and hydrogen and optionally oxygen, phosphorus, silicon, nitrogen, sulfur, halogen, and mixtures thereof, wherein the organic compound has a molecular weight of between about 120 and about 455, and possesses a boiling point of between about 150° C. and about 480° C. The non-solvents more preferably have a boiling point of between about 280° C. and about 480° C., even more preferably between about 300° C. and about 480° C. The non-solvents preferably are soluble in the solvent used at elevated temperatures.

Preferred non-solvents useful in this invention include 1,3,5-triphenylbenzene, tetraphenylmethane, tetraphenylsilane, diphenylsulfoxide, 1,1-diphenylacetone, 1,3-diphenylacetone, 4-acetylbiphenyl, 4,4'-diphenylbenzophenone, 1-benzoyl-4-piperidone, diphenyl carbonate, bibenzyl, diphenylmethylphosphate, 1-bromonapthalene, 2-phenoxybiphenyl, triphenylphosphate, cyclohexylphenylketone, 1,4-dibenzoylbutane, 2,4,6-trichlorophenol, mineral oil, paraffin oil, petroleum oil, for example, MOBILTHERM 600® heat transfer oil, MOBILTHERM 603® heat transfer oil, MOBILTHERM 605® heat transfer oil (®all trademarks of Mobile Oil Corporation), butyl stearate, 9-phenylanthracene, 2-phenylphenol, 1-ethoxynaphthalene, phenylbenzoate, 1-phenyldecane, 1-methoxynaphthalene, 2-methoxynaphthalene, 1,3-diphenoxybenzene, 1,8-dichloroanthraquinone, 9,10-dichloroanthracene, polyphosphoric acid, 1-chloronaphthalene, diphenylether, 1-cyclohexyl-2-pyrrolidinone, hydrogenated terphenyl, for example, HB-40® hydrogenated terphenyl (200 trademark of the Monsanto Company), dioctylphthalate, 5-chloro-2-benzoxazolone, dibenzothiophene, diphenylsulfide, diphenylchlorophosphate, fluorene, sulfolane, methyl myristate, methyl stearate, hexadecane, dimethyl phthalate, tetraethylene glycol dimethylether, diethylene glycol dibutylether, docosane, eicosane, dotriacontane, 2,7-dimethoxynaphthalene, 2,6-dimethoxynaphthalene, o-terphenyl, 1,1-diphenylethylene, epsiloncaprolactam, thianthrene, silicone oil, for example, DC-704® silicone oil and DC-710® silicone oil (®trademarks of Dow-Corning Corporation), and mixtures thereof.

More preferred non-solvents include 1,3,5-triphenylbenzene, tetraphenylmethane, tetraphenylsilane, diphenylsulfoxide, 1,1-diphenylacetone, 1,3-diphenylacetone, diphenylcarbonate, diphenylmethylphosphate, 2-phenoxybiphenyl, butyl stearate, 9-phenylanthracene, 1-cyclohexyl-2-pyrrolidinone, mineral oil, paraffin oil, petroleum oil, for example, MOBILTHERM 600® heat transfer oil, MOBILTHERM 603® heat transfer oil, MOBILTHERM 605® heat transfer oil (®all trademarks of Mobile Oil Corporation), HB-40® hydrogenated terphenyl (200 trademark of the Monsanto Company), dioctylphthalate, dibenzothiophene, diphenylchlorophosphate, methyl myristate, methyl stearate, docosane, eicosane, dotriacontane, o-terphenyl, thianthrene, silicone oil, for example, DC-704® silicone oil and DC-710® silicone oil (®trademarks of Dow-Corning Corporation), and mixtures thereof.

Even more preferred non-solvents include 1,3,5-triphenylbenzene, tetraphenylmethane, tetraphenylsilane, diphenylsulfoxide, 2-phenoxybiphenyl, butyl stearate, 9-phenylanthracene, dioctylphthalate, methyl stearate, docosane, dotriacontane, thianthrene, mineral oil, paraffin oil, petroleum oil, for example, MOBILTHERM 600® heat transfer oil, MOBILTHERM 603® heat transfer oil, MOBILTHERM 605® heat transfer oil (®all trademarks of Mobile Oil Corporation), and mixtures thereof.

The concentrations of the components in the mixture may vary and are dependent upon the desired membrane characteristics, such as porosity and pore size, and the fabrication method. The concentrations of poly(etheretherketone)-type polymer, the low melting point crystallizable polymer, and the optional plasticizer in the mixture is that which result in a mixture with a suitable viscosity for extrusion or casting at the membrane fabrication temperature. The viscosity of the mixture must not be so high that the fluid is too viscous to fabricate; the viscosity must not be too low such that the membrane lacks physical integrity. Extrusion mixtures of poly(etheretherketone)-type polymers, low melting point crystallizable polymers, and optional plasticizers generally possess non-Newtonian viscosity behavior; therefore, such mixtures exhibit a shear rate dependence upon viscosity. The mixture preferably has a viscosity at extrusion temperatures of between about 100 and about 10,000 poise at a shear rate of from about 10 to about 10,000 sec$^{-1}$, more preferably between about 200 and about 1,000 poise at a shear rate of from about 50 to about 1,000 sec$^{-1}$.

The concentration of poly(etheretherketone)-type polymer in the mixture is preferably from about 10 to about 90 weight percent, more preferably from about 20 to about 80 weight percent, even more preferably from about 25 to about 75 weight percent.

The concentration of low melting point crystallizable polymer in the mixture is preferably from about 3 to about 80 weight percent, more preferably from about 3 to about 70 weight percent, even more preferably from about 3 to about 65 weight percent.

The membranes of this invention may be prepared by casting or extrusion. In the casting process, the polymers are optionally mixed with the plasticizer comprising at least one solvent and optionally at least one non-solvent for the polymers at elevated temperatures. The elevated temperature at which the mixture is mixed is that temperature at which the mixture is a fluid, and below that temperature at which the polymers degrade and below that temperature at which the optional plasticizer comprising solvent and optional non-solvent boils. The upper temperature limit is preferably below about 360° C., more preferably below about 345° C., even more preferably below about 330° C. The minimum temperature limit is preferably at least about 25° C. The contacting takes place with adequate mixing or agitation.

In the case of casting, a membrane may be cast into flat sheet form by pouring the fluid mixture onto a smooth support surface and drawing down the fluid mixture to an appropriate thickness with a suitable tool such as a doctor blade or casting bar. Alternately, the fluid mixture may be cast in a continuous process by casting the fluid mixture onto endless belts or rotating drums. The casting surface may be such that the membrane may thereafter be readily separated from the surface. For example, the membrane may be cast onto a support having a low surface energy, such as silicone, coated glass, Teflon, or coated metal, or a surface to which the membrane will not adhere. Alternately, the fluid mixture may be cast onto a support surface which may thereafter be dissolved away from the finished membrane. The fluid mixture may also be cast onto a porous support surface. The cast membrane is thereafter subsequently quenched or coagulated, leached, and optionally drawn as described hereinafter for membranes formed by the extrusion process.

Membranes may be extruded from the poly(etheretherketone)-type polymer mixtures hereinbefore described. The components of the extrusion mixture may be combined prior to extrusion by mixing in any convenient manner with conventional mixing equipment, as for example, in a Hobart brand mixer. The components of the extrusion mixture may also be combined and mixed under heating in a resin kettle. Alternately, the extrusion mixture may be prepared by extruding the components through a twin screw extruder, cooling the extrudate, and grinding or pelletizing the extrudate to a particle size readily fed to a single or twin screw extruder. Alternately, the components of the extrusion mixture may be combined directly in a melt-pot or twin screw extruder and extruded into a membrane in a single step. The use of static mixers may be employed.

The mixture is heated to a temperature which results in a fluid possessing a viscosity suitable for extrusion. The temperature should not be so high or the exposure time so long as to cause significant degradation of the poly(etheretherketone)-type polymer, the low melting point crystallizable polymer, and/or the optional plasticizer. The temperature should not be so low as to render the fluid too viscous to extrude. The extrusion temperature is preferably between about 100° C. and about 400° C., more preferably between about 110° C. and about 380° C., even more preferably between about 120° C. and about 370° C.

The mixture of polymers and optional plasticizer is extruded through a film, tube, or hollow fiber die (spinnerette). Hollow fiber spinnerettes typically are multiholed and thus produce a tow of multiple fibers. The hollow fiber spinnerettes include a means for supplying fluid to the core of the extrudate. The core fluid is used to prevent the collapsing of the hollow fibers as they exit the spinnerette. The core fluid may be a gas such as nitrogen, air, carbon dioxide, or other inert gas or a liquid which is a non-solvent for the polymers. Examples of suitable core liquids include dioctylphthalate, methyl stearate, polyglycol, mineral oil, paraffin oil, petroleum oil, for example, MOBILTHERM® 600, 603, and 605 heat transfer oils (®trademarks of Mobil Oil Corporation), and silicone oil, for example, DC-704® and DC-710® silicone oil (®trademarks of Dow-Corning Corporation). Use of a liquid non-solvent as the core fluid may result in a microporous membrane with an inside skin. A solvent and non-solvent core liquid mixture may be used to control the inside skin morphology. A non-solvent fluid may optionally be used on the outside of the hollow fiber membrane to produce an outside skin.

The extrudate exiting the die enters one or more quench or coagulation zones. The environment of the quench or coagulation zone may be gaseous or liquid. Within the quench or coagulation zone, the extrudate is subjected to cooling and/or coagulation to cause solidification of the membrane with the optional simultaneous removal of a portion of the plasticizer and/or low melting point crystallizable polymer.

In a preferred embodiment, the membrane is initially quenched in a gaseous environment such as air, nitrogen, or other inert gas. The temperature of the gaseous quench zone is that temperature at which solidification occurs at a reasonable rate. The temperature of the gaseous quench zone is preferably in the range of from about 0° C. to about 275° C., more preferably in the range of from about 5° C. to about 150° C., even more preferably in the range of from about 10° C. to about 90° C. The residence time in the gaseous quench zone is that which is sufficient to solidify the membrane. The residence time in the gaseous quench zone is preferably at least about 0.01 seconds, more preferably at least about 0.05 seconds. The residence time in the gaseous quench zone is preferably less than about 300 seconds, more preferably less than about 120 seconds, even more preferably less than about 90 seconds. Shrouds may be used to help control gaseous flowrates and temperatures within the gaseous quench zone.

Following or instead of the gaseous quench, the membrane may optionally be quenched or coagulated in a liquid environment which is substantially a non-solvent for the poly(etheretherketone)-type polymer, such as water, ethylene glycol, or glycerol, and which optionally contains an effective amount of a swelling agent. The temperature of the quench or coagulation liquid is that temperature at which the membrane is not adversely affected and at which solidification occurs at a reasonable rate. The quench or coagulation liquid temperature is preferably between about 0° C. and about 275° C., more preferably between about 5° C. and about 250° C., even more preferably between about 10° C. and about 225° C. The residence time in the liquid quench zone is that which is sufficient to solidify the membrane. The residence time in the liquid quench zone is preferably at least about 0.01 seconds, more preferably at least about 0.05 seconds. The residence time in the liquid quench zone is preferably less than about 300 seconds, more preferably less than about 120 seconds, even more preferably less than about 90 seconds.

Following quenching and/or coagulation, the membrane may be passed through one or more leach zones to remove at least a portion of the low melting point crystallizable polymer, at least a portion of the plasticizer, or a combination thereof. The leach zone need not remove all of the plasticizer and/or low melting point crystallizable polymer from the membrane. The leach zone preferably removes a substantial portion of the plasticizer and/or low melting point crystallizable polymer. Preferably, the leach zone removes the plasticizer to a level of less than about 5.0 weight percent in the leached membrane, more preferably less than about 2.0 weight percent in the leached membrane. Preferably, the leach zone removes the low melting point crystallizable polymer to a level of less than about 5.0 weight percent in the leached membrane, more preferably less than about 2.0 weight percent in the leached membrane.

The leach zone is comprised of a liquid which is a non-solvent for the poly(etheretherketone)-type polymer but which is a solvent for the plasticizer and/or low melting point crystallizable polymer. Preferred leach liquids include toluene, xylene, acetone, water, and chlorinated hydrocarbons such as methylene chloride, carbon tetrachloride, trichloroethylene, and 1,1,1-trichloroethane. The leach liquid may also comprise an acid or alkali aqueous solution if an acid or alkali soluble solvent and optional non-solvent for the poly(etheretherketone)-type polymer are used in the extrusion or casting mixture.

The maximum temperature of the leach bath is that temperature at which the membrane is not adversely affected. The minimum temperature of the leach bath is that temperature at which plasticizer removal from the membrane occurs at a reasonable rate. The temperature of the leach bath is preferably between about 0° C. and about 250° C., more preferably between about 5° C. and about 200° C., even more preferably between about 10° C. and about 150° C. The residence time in the leach bath is preferably long enough to remove at least a portion of the plasticizer. The residence time in the leach bath is preferably less than about 14 hours, more preferably less than about 2 hours. The residence time in the leach bath is preferably more than about 1 second, more preferably more than about 30 seconds.

Following leaching, the membrane may optionally be dried. Prior to drying, the leach liquid remaining in the membrane may optionally be exchanged with a more volatile, non-polar drying agent which possesses a low surface tension and is a solvent for the leach liquid and which is a non-solvent for the poly(etheretherketone)-type polymer in order to reduce the possibility of pore collapse during drying. Preferred drying agents include chlorofluorocarbons, for example, FREON 113® chlorofluorocarbon (®trademark of E.I. duPont de Nemours). The exchange may be carried out at temperatures which do not adversely affect the membrane, preferably between about 0° C. and about 100° C. The membrane may be dried in air or an inert gas such as nitrogen. Drying may also be done under vacuum. The membrane may be dried at temperatures at which drying takes place at a reasonable rate and which do not adversely affect the membranes. The drying temperature is preferably between about 0° C. and about 180° C., more preferably between about 10° C. and about 150° C., even more preferably between about 15° C. and about 120° C. The drying time is preferably less than about 24 hours, more preferably less than about 6 hours. The drying time is preferably at least about 30 seconds, more preferably at least about 60 seconds.

The membrane may optionally be drawn or stretched subsequent to the quench/coagulation step using conventional equipment such as godets to improve the flux and strength of the membrane. Drawing may occur before leaching, during leaching, after leaching, or a combination thereof. The draw temperature is dependent upon whether the membrane contains plasticizer at the time of drawing. For substantially plasticizer-free membranes, the membrane is drawn at a temperature which is above the glass transition temperature and below the crystalline melting point of the poly(etheretherketone)-type polymer; the minimum temperature at which the membranes are drawn is preferably at least about 140° C., more preferably at least about 150° C. The maximum temperature at which the membrane is drawn is preferably less than about 360° C., more preferably less than about 330° C. For membranes containing plasticizer, the membrane is drawn at a temperature between ambient temperature and the melting point of the poly(etheretherketone)-type polymer or the depressed melting point of the poly(etheretherketone)-type polymer and plasticizer mixture; preferred lower draw temperatures are about 25° C. or above; preferred upper draw temperatures are less than about 10° C. below the depressed melting point. The membrane is drawn by stretching the membrane under tension. The membrane is drawn to a ratio of between about 1.1 to about 40. The draw ratio refers to the ratio of the original length of the membrane before drawing to the final length of the membrane after drawing. The degree of draw may also be expressed as percent elongation, which is calculated by:

$$\frac{L_f - L_i}{L_i} \times 100,$$

wherein $L_f$ is the final length of the membrane after drawing and $L_i$ is the initial length of the membrane before drawing. Drawing may be carried out in a single step or in a series of steps using the same or different draw ratios in each step.

Line speeds for drawing are not critical and may vary significantly. Practical preferred line speeds range from about 10 feet per minute (3 meters per minute) to about 2,000 feet per minute (610 meters per minute). In the case of hollow fibers, the drawn fiber preferably possesses an outside diameter of from about 10 to about 7,000 microns, more preferably of from about 50 to about 5,000 microns, even more preferably of from about 100 to about 3,000 microns, with a wall thickness preferably of from about 10 to about 700 microns, more preferably of from about 25 to about 500 microns. In the case of films, the film preferably possesses a thickness of from about 10 to about 700 microns, more preferably of from about 20 to about 500 microns, even more preferably of from about 25 to about 250 microns. The films may optionally be supported by a permeable cloth or screen.

Optionally, before leaching, after leaching, before drawing, after drawing, or a combination thereof, the membrane may be annealed by exposing the membrane to elevated temperatures. The membrane may be annealed at temperatures above the glass transition temperature (Tg) of the poly(etheretherketone)-type polymer or poly(etheretherketone)-type polymer and plasticizer mixture and about 10° C. below the melting point of the polymer or depressed melting point of the poly(etheretherketone)-type polymer and plasticizer mixture for a period of time between about 30 seconds and about 24 hours.

The membranes of this invention may be isotropic or anisotropic. Isotropic microporous membranes possess a morphology in which the pore size within the membrane is substantially uniform throughout the membrane. Anisotropic (asymmetric) microporous membranes possess a morphology in which a pore size gradient exists across the membrane; that is, the membrane morphology varies from highly porous, larger pores at one membrane surface to less porous, smaller pores at the other membrane surface. Such anisotropic membranes thus possess a microporous "skin" of smaller pores. In hollow fiber anisotropic membranes, the "skin" may be on the inside or outside surface of the hollow fiber. The term asymmetric is often used interchangeably with the term anisotropic.

In a preferred embodiment of this invention, the microporous membranes are useful in the treatment of liquids by the membrane separation processes of microfiltration, ultrafiltration, macrofiltration, depth filtration, membrane stripping, and membrane distillation. Such membranes may also be used as porous supports for composite gas or liquid separation membranes. In an especially preferred embodiment, the microporous membranes are useful for ultrafiltration or microfiltration. Ultrafiltration and microfiltration are pressure driven filtration processes using microporous membranes in which particles or solutes are separated from solutions. Separation is achieved on the basis of difference in particle size or molecular weight. Macrofiltration is a pressure driven filtration process using microporous membranes to separate particles or solutes having a size greater than about 10 microns from solution.

Ultrafiltration and microfiltration membranes may be characterized in a variety of ways, including porosity, mean pore size, maximum pore size, bubble point, gas flux, water flux, molecular weight cut off, and Scanning Electron Microscopy (SEM). Such techniques are well known in the art for characterizing microporous membranes. See Robert Kesting, *Synthetic Polymer Membranes,* 2nd edition, John Wiley & Sons, New York, N.Y., 1985, pp. 43–64; Channing R. Robertson (Stanford University), *Molecular and Macromolecular Sieving by Asymmetric Ultrafiltration Membranes,* OWRT Report, NTIS No. PB85-1577661EAR, September 1984; and ASTM Test Methods F316-86 and F317-72 (1982); the relevant portions of each incorporated herein by reference.

Porosity refers to the volumetric void volume of the membrane. The membranes must possess porosities permitting sufficient flux through the membrane while retaining sufficient mechanical strength under use conditions. The membranes of this invention preferably have a porosity of at least about 10 percent, more preferably of at least about 20 percent, even more preferably of at least about 25 percent; the membranes of this invention preferably have a porosity of less than about 90 percent, more preferably of less than about 80 percent, even more preferably of less than about 75 percent.

Pore size of the membrane may be estimated by several techniques including Scanning Electron Microscopy (SEM), and/or measurements of bubble point, gas flux, water flux, and molecular weight cut off. The pore size of any given membrane is distributed over a range of pore sizes, which may be narrow or broad.

The bubble point pressure of a membrane is measured by mounting the membrane in a pressure cell with liquid in the pores of the membrane. The pressure of the cell is gradually increased until air bubbles permeate the membrane. Because larger pores become permeable at lower pressures, the first appearance of bubbles is indicative of the maximum pore size of the membrane. If the number of pores which are permeable to air increases substantially with a small increase in pressure, a narrow pore size distribution is indicated. If the number of air-permeable pores increases gradually with increasing pressure, a broad pore size distribution is indicated. The relationship between pore size and bubble point pressure can be calculated from the equation $$r = \frac{2G}{P},$$

wherein
r is the pore radius,
G is the surface tension (water/air), and
P is the pressure.

The mean pore size of the membranes of this invention useful for ultrafiltration is preferably between about 5 and about 1,000 Angstroms, more preferably between about 10 and about 500 Angstroms; the maximum pore size of such membranes is preferably less than about 1,000 Angstroms, more preferably less than about 800 Angstroms. The mean pore size of the membranes of this invention useful for microfiltration is preferably between about 0.2 and about 10 microns, more preferably between about 0.05 and about 5 microns; the maximum pore size of such membranes is preferably less than about 10 microns, more preferably less than about 8 microns. The mean pore size of membranes of this invention useful for macrofiltration is preferably between about 10 and about 50 microns.

Gas flux is defined as $$F = \frac{\text{(amount of gas passing through the membrane)}}{\text{(membrane area)(time)} \cdot \text{(driving force across the membrane)}}.$$

A standard gas flux unit is $$\frac{\text{(centimeter)}^3 \text{(STP)}}{\text{(centimeter)}^2 \text{(second)(centimeter Hg)}},$$

abbreviated hereinafter as $$\frac{cm^3(STP)}{cm^2 \ sec \ cmHg},$$

where STP stands for standard temperature and pressure.

The membranes of this invention preferably have a gas flux for nitrogen of at least about $$10^{-6} \frac{cm^3(STP)}{cm^2 \ sec \ cmHg},$$

more preferably of at least about $$10^{-5} \frac{cm^3(STP)}{cm^2 \ sec \ cmHg},$$

even more preferably of at least about $$10^{-4} \frac{cm^3(STP)}{cm^2 \ sec \ cmHg}.$$

Water flux is defined as $$W = \frac{\text{(amount of water passing through the membrane)}}{\text{(membrane area)(time)}},$$

under given conditions of temperature and pressure.

The membranes of this invention preferably exhibit a water flux of at least about $$1 \frac{ml}{m^2 \ hr \ cmHg},$$

more preferably of at least about $$10 \frac{ml}{m^2 \ hr \ cmHg},$$

even more preferably of at least about $$100 \frac{ml}{m^2 \ hr \ cmHg}.$$

The membranes are fabricated into flat sheet, spiral wound, tubular, or hollow fiber devices by methods described in the art. Spiral wound, tubular, and hollow fiber devices are preferred. Tubesheets may be affixed to the membranes by techniques known in the art. Preferred tubesheet materials include thermoset and thermoplastic polymers. The membrane is sealingly mounted in a pressure vessel in such a manner that the membrane separates the vessel into two fluid regions wherein fluid flow between the two regions is accomplished by fluid permeating through the membrane. Conventional membrane devices and fabrication procedures are well known in the art.

Ultrafiltration, microfiltration, and macrofiltration are pressure driven filtration processes using microporous membranes to recover or isolate solutes or particles from solutions. The membrane divides the separation chamber into two regions, a higher pressure side into which the feed solution is introduced and a lower pressure side. One side of the membrane is contacted with the feed solution under pressure, while a pressure differential is maintained across the membrane. To be useful, at least one of the particles or solutes of the solution is selectively retained on the high pressure side of the membrane while the remainder of the solution selectively passes through the membrane. Thus the membrane selectively "rejects" at least one type of the particles or solutes in the solution, resulting in a retentate stream being withdrawn from the high pressure side of the membrane which is enriched or concentrated in the selectively rejected particle(s) or solute(s) and a filtrate stream being withdrawn from the low pressure side of the membrane which is depleted in the selectively rejected particle(s) or solute(s).

The separation process should be carried out at pressures which do not adversely affect the membrane, that is, pressures which do not cause the membrane to mechanically fail. The pressure differential across the membrane is dependent upon the membrane characteristics, including pore size and porosity. For the membranes of this invention useful for ultrafiltration or microfiltration, the pressure differential across the membrane is preferably between about 5 psig and about 500 psig, more preferably between about 10 psig and about 300 psig, even more preferably between about 25 and about 150 psig. For the membranes of this invention useful as composite supports for liquid or gas separation membranes, the pressure differential across the membrane is preferably between about 5 psig and about 1,500 psig. The separation process should be carried out at temperatures which do not adversely affect membrane integrity. Under continuous operation, the operating temperature is preferably between about 0° C. and about 300° C., more preferably between about 15° C. and about 250° C., even more preferably between about 20° C. and about 175° C.

SPECIFIC EMBODIMENTS

The following examples are presented for illustrative purposes only and are not intended to limit the scope of the invention or claims.

EXAMPLE 1

Solvents and Non-solvents for Poly(etheretherketone) (PEEK)

Poly(etheretherketone) (PEEK), designated as Grade 150P, was obtained from ICI Americas, Inc., Wilmington, Del. The PEEK was dried at 150° C. for 16 hours in an air-circulating oven and was stored in a desiccator over Drierite. One hundred seven organic compounds were evaluated for their solvent effect on PEEK. Most of the organic compounds were obtained from Aldrich Chemical Company and used as received. Other organic chemicals were obtained from suppliers as listed in *Chemical Sources*, published annually by Directories Publishing Co., Inc., of Columbia, S.C.

Mixtures of PEEK and a solvent or a non-solvent, a total weight of less than about 2 grams, were prepared by weighing PEEK and solvent or non-solvent to a precision of ±0.001 gram in a 1 to 4 dram size glass vial. The resulting air space in each vial, which varied considerably due to the large differences in the bulk densities of the compounds, was purged with nitrogen. The vials were sealed with screw caps containing aluminum foil liners. Solubility was usually determined at about 10 weight percent polymer, followed by additional determinations at about 25 and about 50 weight percent if necessary.

In the following tables, in the solubility column, "g" is greater than (>), and "s" is smaller or less than (<), and "=" is equal to.

Table I below lists the solvent effect of 107 organic compounds on PEEK. The approximate solubility of each polymer-organic compound mixture is shown at the indicated temperature(s). Also listed in Table I is an approximate molecular weight, melting point, and boiling point of each organic compound, if these physical properties were available.

TABLE I

| Compound | Approximate Molec. Weight | Melting Point | Boiling Point | Solub. (g = >; s = <) | Temp. (°C.) |
| --- | --- | --- | --- | --- | --- |
| Triphenylmethanol | 260 | 161 | 360 | g 50.1%? | 349 |
| Triphenylmethane | 244 | 93 | 359 | g 50.2% | 349 |
| Triphenylene | 228 | 196 | 438 | g 50.0% | 350 |
| 1,2,3-Triphenylbenzene | 306 | 158 | — | g 50.1% | 349 |
| 1,3,5-Triphenylbenzene | 306 | 173 | 460 | s 9.9% | 349 |
| Tetraphenylmethane | 320 | 281 | 431 | = s 10.7% | 349 |
| Tetraphenylsilane | 337 | 236 | 422 | s 10.1% | 349 |
| Diphenyl sulfoxide | 202 | 70 | 350 | s 10.5%a | 349 |
| Diphenyl sulfone | 218 | 124 | 379 | g 50.0% | 349 |
| 2,5-Diphenyloxazole | 221 | 72 | 360 | g 50.0% | 349 |
| Diphenic acid | 242 | 228 | — | g 25.1%?a | 349 |
| 1,1-Diphenylacetone | 210 | 60 | — | s 10.0% | 302 |
| 1,3-Diphenylacetone | 210 | 33 | 330 | s 10.1% | 302 |
| 4-Acetylbiphenyl | 196 | 117 | — | s 10.3% | 302 |
| 2-Biphenylcarboxylic acid | 198 | 109 | 349 | g 50.1% | 349 |
| 4-Biphenylcarboxylic acid | 198 | 225 | — | g 10.0% | 349 |
| 4-Biphenylcarboxylic acid | 198 | 225 | — | = g 50.1%? | 349 |
| m-Terphenyl | 230 | 83 | 379 | g 50.2% | 349 |
| m-Terphenyl | 230 | 83 | 379 | s 5.0% | 302 |
| 4-Benzoylbiphenyl | 258 | 100 | 419 | g 50.1% | 349 |
| 4-Benzoylbiphenyl | 258 | 100 | 419 | s 5.2% | 302 |
| 4,4'-Diphenylbenzophenone | 334 | — | — | s 10.4% | 302 |
| 1-Benzoyl-4-piperidone | 203 | 56 | 399 | g 9.8%?a | 349 |
| 2-Benzoylnaphthalene | 232 | 81 | 383 | g 49.9% | 349 |
| Diphenyl carbonate | 214 | 79 | 301 | s 10.1% | 302 |
| Bibenzyl | 182 | 51 | 284 | s 10.3% | 274 |

TABLE I-continued

| Compound | Molec. Weight | Melting Point | Boiling Point | Approximate Solub. (g = >; s = <) | Temp. (°C.) |
|---|---|---|---|---|---|
| Diphenyl methyl phosphate | 264 | — | 389 | s 10.0%a | 349 |
| 1-Bromonaphthalene | 207 | −1 | 280 | s 9.8% | 274 |
| N,N-Diphenylformamide | 197 | 71 | 337 | g 9.9% | 302 |
| N,N-Diphenylformamide | 197 | 71 | 337 | s 25.2% | 302 |
| 3-Phenoxybenzyl alcohol | 200 | — | 329 | g 24.7% | 302 |
| 3-Phenoxybenzyl alcohol | 200 | — | 329 | s 49.9% | 302 |
| Fluoranthene | 202 | 108 | 384 | g 50.0% | 349 |
| 2-Phenoxybiphenyl | 246 | 49 | 342 | s 10.9% | 302 |
| Triphenyl phosphate | 326 | 51 | 281 | s 9.9% | 274 |
| Cyclohexyl phenyl ketone | 188 | 56 | — | s 9.9% | 302 |
| 2,5-Diphenyl-1,3,4-oxadiazole | 222 | 139 | 382 | g 49.9% | 349 |
| 1,4-Dibenzoylbutane | 266 | 107 | — | s 10.0% | 302 |
| 9-Fluorenone | 180 | 83 | 342 | g 24.9% | 302 |
| 9-Fluorenone | 180 | 83 | 342 | s 50.0% | 302 |
| 1,2-Dibenzoyl benzene | 286 | 146 | — | g 50.2% | 349 |
| Dibenzoylmethane | 224 | 78 | 360 | g 50.4% | 349 |
| 2,4,6-Trichlorophenol | 197 | 65 | 246 | s 9.0% | 240 |
| Benzil | 210 | 94 | 347 | g 10.2% | 302 |
| Benzil | 210 | 94 | 347 | s 25.0% | 302 |
| p-Terphenyl | 230 | 212 | 389 | s 9.8% | 302 |
| p-Terphenyl | 230 | 212 | 389 | g 50.0% | 349 |
| Anthracene | 178 | 216 | 340 | g 10.0% | 302 |
| Anthracene | 178 | 216 | 340 | s 24.7% | 302 |
| Mineral oil | — | — | 360 | s 10.7% | 349 |
| 4,4'-Dibromobiphenyl | 312 | 170 | 355 | g 5.2% | 300 |
| 4,4'-Dibromobiphenyl | 312 | 170 | 355 | s 25.1% | 302 |
| 4,4'-Dibromobiphenyl | 312 | 170 | 355 | g 50.1% | 349 |
| Benzophenone | 182 | 50 | 305 | s 11.3% | 241 |
| Benzophenone | 182 | 50 | 305 | = g 11.3% | 300 |
| Benzophenone | 182 | 50 | 305 | s 24.9% | 302 |
| Polyphosphoric acid | — | — | — | s 4.8%a | 300 |
| 1-Chloronaphthalene | 162 | −20 | 258 | s 9.9% | 241 |
| Diphenyl ether | 170 | 27 | 259 | s 10.1% | 241 |
| 1-Cyclohexyl-2-pyrrolidinone | 167 | — | 302 | = s 10.0%a | 300 |
| 1-Benzyl-2-pyrrolidinone | 175 | — | — | g 14.9% | 302 |
| 1-Benzyl-2-pyrrolidinone | 175 | — | — | s 32.9% | 302 |
| o,o'-Biphenol | 186 | 109 | 315 | s 5.1% | 221 |
| o,o'-Biphenol | 186 | 109 | 315 | g 9.8% | 302 |
| o,o'-Biphenol | 186 | 109 | 315 | s 25.0% | 302 |
| HB-40 (hydrogenated terphenyl)* | 244 | — | 325 | s 9.9% | 302 |
| Dioctyl phthalate | 391 | −50 | 384 | s 10.8% | 349 |
| 5-Chloro-2-benzoxazolone | 170 | 191 | — | s 10.2%a | 349 |
| Dibenzothiophene | 184 | 98 | 332 | g 10.3%?b? | 302 |
| Bis(4-chlorophenyl sulfone) | 287 | 146 | 412 | s 15.3% | 349 |
| Diphenyl phthalate | 318 | 79.5 | — | g 50.0% | 349 |
| 2,6-Diphenylphenol | 246 | 101 | — | g 50.0% | 349 |
| Diphenyl sulfide | 186 | −40 | 296 | s 9.0% | 274 |
| Diphenyl chlorophosphate | 269 | — | 360 | s 9.9% | 349 |
| Fluorene | 166 | 113 | 298 | s 10.1% | 274 |
| Phenanthrene | 178 | 100 | 340 | g 10.0% | 302 |
| Phenanthrene | 178 | 100 | 340 | s 25.0% | 302 |
| Sulfolane | 120 | 27 | 285 | s 10.1% | 274 |
| Methyl myristate | 242 | 18 | 323 | s 8.2% | 302 |
| Methyl stearate | 299 | 38 | 358 | s 10.1% | 349 |
| Phenothiazine | 199 | 182 | 371 | g 49.9% | 349 |
| Hexadecane | 226 | 19 | 288 | s 10.0% | 274 |
| Dimethyl phthalate | 194 | 2 | 282 | s 10.0% | 274 |
| Tetraethylene glycol dimethyl ether | 222 | −30 | 275 | s 9.6% | 240 |
| Diethylene glycol dibutyl ether | 218 | −60 | 256 | s 9.6% | 240 |
| Docosane | 311 | 44 | 369 | s 10.4% | 349 |
| Eicosane | 283 | 37 | 340 | s 7.9% | 302 |
| Dotriacontane | 451 | 70 | 476 | s 10.4% | 349 |
| 2,7-Dimethoxynaphthalene | 188 | 138 | — | g 10.0%ab | 349 |
| 2,6-Dimethoxynaphthalene | 188 | 153 | — | g 10.8%b | 349 |
| o-Terphenyl | 230 | 58 | 337 | s 9.9% | 302 |
| 4,4'-Dimethoxy-benzophenone | 242 | 142 | — | g 50.0% | 349 |
| 9,10-Diphenylanthracene | 330 | 246 | — | g 50.0% | 349 |
| 1,1-Diphenylethylene | 180 | 6 | 270 | s 9.7% | 240 |
| epsilon-Caprolactam | 113 | 71 | 271 | s 10.0% | 240 |
| Tetraphenylethylene | 332 | 223 | 420 | s 10.9% | 302 |
| Pentafluorophenol | 184 | 35 | 143 | s 9.9% | 140 |
| Pentafluorophenol | 184 | 35 | 143 | g 5.0% | 141 |
| Pentafluorophenol | 184 | 35 | 143 | s 10.0% | 302 |
| Thianthrene | 216 | 158 | 365 | s 10.2% | 302 |

TABLE I-continued

| Compound | Molec. Weight | Melting Point | Boiling Point | Approximate Solub. (g = >; s = <) | Temp. (°C.) |
|---|---|---|---|---|---|
| Pentachlorophenol | 266 | 189 | 310 | g 25.0% | 302 |
| Pentachlorophenol | 266 | 189 | 310 | s 50.6% | 302 |
| Pyrene | 202 | 150 | 404 | g 50.0% | 347 |
| Benzanthrone | 230 | 169 | — | s 25.5%ab | 328 |
| 9,9'-Bifluorene | 330 | 247 | — | g 25.2% | 327 |
| 9,9'-Bifluorene | 330 | 247 | — | s 50.2% | 318 |
| 9,9'-Bifluorene | 330 | 247 | — | g 50.2% | 327 |
| Santowax R* | — | 145 | 364 | g 60.0% | 347 |
| Chem Abstr. #26140-60-3 Therminol 66* | 240 | — | 340 | g 50.1% | 337 |
| Chem Abstr. #61788-32-7 Therminol 75* | — | 70 | 385 | g 24.9% | 325 |
| Chem Abstr. #26140-60-3 Chem Abstr. #217-59-4 Therminol 75* | — | 70 | 385 | g 50.3% | 332 |
| 1-Phenyl-2-pyrrolidinone | 161 | 68 | 345 | g 10.1% | 279 |
| 1-Phenyl-2-pyrrolidinone | 161 | 68 | 345 | g 25.5% | 290 |
| 1-Phenyl-2-pyrrolidinone | 161 | 68 | 345 | g 50.0% | 317 |
| 4,4'-Isopropylidenediphenol | 228 | 156 | 402 | = g 50.0% | 301 |
| 4,4'-Isopropylidenediphenol | 228 | 156 | 402 | g 50.0% | 318 |
| 4,4'-Didihydroxy-benzophenone | 214 | 214 | — | s 10.0% | 301 |
| 4,4'-Dihydroxy-benzophenone | 214 | 214 | — | g 25.0% | 310 |
| 4,4'-Dihydroxy-benzophenone | 214 | 214 | — | s 50.0% | 319 | a = Black or very dark color
b = reacts?
*Monsanto Company

FIG. 1 shows a composite of temperature at ambient pressure at which a specific weight percent of PEEK will dissolve in the solvents m-terphenyl, pyrene, fluoranthene and diphenylsulfone. Any combination of temperature and polymer concentration above each line represents homogeneous, soluble, one phase mixtures. Similarly, any combination below each line represents insoluble, multiphase mixtures.

EXAMPLE 2

Microporous Poly(etheretherketone) Membranes From Poly(etheretherketone), Poly(caprolactone), and Diphenylsulfone Microporous poly(etheretherketone) (PEEK) film membranes were prepared from a mixture of PEEK, poly(caprolactone), and diphenylsulfone using the following procedure.

A mixture of about 50 weight percent poly(etheretherketone), VICTREX TM 450P (TM trademark of ICI Americas, Inc.), and about 50 weight percent diphenylsulfone was compounded, extruded, and pelletized using a twin screw extruder, a die temperature of about 305° C. to about 310° C., and an extrusion rate of about 17.5 to 18.5 grams/minutes. The resulting pellets had a composition of about 53 weight percent PEEK as measured by thermogravimetric analysis (TGA) at a heating rate of about 20° C./minute under nitrogen.

The PEEK/diphenylsulfone pellets thus obtained were mixed with poly(caprolactone) pellets, CAPA TM 650 (TM trademark of Interox Chemicals Ltd.) in a weight ratio of about 40 percent PEEK, about 40 percent diphenylsulfone, and about 20 percent poly(caprolactone). The mixture of pellets was extruded into a film using a twin screw extruder equipped with a 2.25 inch (5.72 centimeter) wide film die at an extrusion temperature (die temperature) of about 310° C. and an extrusion rate of about 40 grams/minute. The extruded film was taken up on a chilled godet. The draw ratio varied from 1 to about 3. The actual composition of the extruded film as measured by TGA at a heating rate of about 5° C./minute under vacuum was about 42.5 weight percent PEEK, about 36.7 weight percent diphenylsulfone, and about 20.8 weight percent poly(caprolactone).

The diphenylsulfone and poly(caprolactone) were leached from the film by immersing the film in an acetone bath at room temperature for about 1 hour and vacuum drying the film for about 2 hours. The film was then immersed in a toluene bath at room temperature for about 1 hour and vacuum dried overnight.

The maximum pore size of the film as measured by Scanning Electron Microscopy was about 30 microns. Samples of the film, each with an effective surface area of about 3.46 square centimeters, were evaluated for nitrogen flux and water flux at room temperature as reported in Table II.

TABLE II

| Sample | Draw Ratio | Thickness (millimeters) | Nitrogen Flux $\left(\frac{cm^3}{cm^2 \ sec \ cmHg}\right)$ | Water Flux $\left(\frac{cm^3}{m^2 \ hr \ cmHg}\right)$ |
|---|---|---|---|---|
| A1 | 1 | 0.471 | 1.37 | $1.53 \times 10^7$ |
| A2 | 1 | 0.495 | 1.38 | $1.20 \times 10^7$ |
| B1 | 2 | 0.241 | 1.45 | $3.04 \times 10^7$ |
| B2 | 2 | 0.278 | 1.33 | $2.77 \times 10^7$ |
| C1 | 2.3 | 0.202 | 1.51 | $6.74 \times 10^7$ |
| C2 | 2.3 | 0.223 | 1.43 | $5.74 \times 10^7$ |
| D1 | 2.7 | 0.172 | 1.43 | $7.05 \times 10^7$ |
| D2 | 2.7 | 0.177 | 1.50 | $5.96 \times 10^7$ |
| E1 | 3 | 0.175 | 1.59 | $6.74 \times 10^7$ |
| E2 | 3 | 0.214 | 1.59 | $6.46 \times 10^7$ |
| F1 | 1.7 | 0.235 | 1.47 | $3.74 \times 10^7$ |
| F2 | 1.7 | 0.243 | 1.41 | $3.83 \times 10^7$ |

EXAMPLE 3

Microporous Poly(etheretherketone) Membranes From Poly(etheretherketone) and Poly(caprolactone)

Microporous poly(etheretherketone) (PEEK) film membranes were prepared from a mixture of PEEK, VICTREX TM 150P (TM trademark of ICI Americas, Inc.), 80 weight percent, and poly(caprolactone), CAPA TM 650 (TM trademark of Interox Chemicals Ltd.), 20 weight percent, using a twin screw extruder equipped with a 2.25 inch (5.72 centimeter) wide film die. The film was extruded at a temperature of bout 340° C. (die temperature). The extruded film was taken up on a chilled godet. The extruded film had a composition of about 81.6 weight percent PEEK and about 18.4 weight percent poly(caprolactone) as measured by thermogravimetric analysis at a heating rate of about 20° C./minute under vacuum. The film was subsequently leached in toluene at room temperature for about 2 hours and dried under vacuum. The film had a maximum pore size of about 0.42 micron at a pressure of about 22 psi and a mean pore size of bout 0.051 micron at a pressure of about 180 psi as determined by the bubble point method. A sample of the film, having an effective surface area of about 3.46 square centimeters, was evaluated for nitrogen flux and water flux at room temperature as reported in Table III.

TABLE III

| Thickness (millimeters) | Nitrogen Flux $\left(\dfrac{cm^3}{cm^2 \ sec \ cmHg}\right)$ | Water Flux $\left(\dfrac{cm^3}{m^2 \ hr \ cmHg}\right)$ |
| --- | --- | --- |
| 0.394 | $3.84 \times 10^{-3}$ | 235 |

EXAMPLE 4

Microporous Poly(etheretherketone) Membranes From Poly(etheretherketone), Poly(caprolactone), and Diphenylsulfone Microporous poly(etheretherketone) (PEEK) film membranes were prepared from a mixture of PEEK, poly(caprolactone), and diphenylsulfone using the following procedure.

A mixture of about 50 weight percent poly(etheretherketone), VICTREX TM 450P (TM trademark of ICI Americas, Inc.), and about 50 weight percent diphenylsulfone was compounded, extruded, and pelletized using a twin screw extruder, and a die temperature of about 310° C.

The PEEK/diphenylsulfone pellets thus obtained were mixed with poly(caprolactone) pellets, CAPA TM 650 (TM trademark of Interox Chemicals Ltd.) in a weight ratio of about 42.5 percent PEEK, about 42.5 percent diphenylsulfone, and about 15 percent poly(caprolactone). The mixture of pellets was extruded into a film using a twin screw extruder equipped with a 2.25 inch (5.72 centimeter) wide film die at an extrusion temperature (die temperature) of about 310° C. The extruded film was taken up on a chilled godet. The actual composition of the extruded film as measured by TGA at a heating rate of about 5° C./minute under vacuum was about 49.7 weight percent PEEK, about 36.9 weight percent diphenylsulfone, and about 13.4 weight percent poly(caprolactone).

The diphenylsulfone and poly(caprolactone) were leached from the film by immersing the film in an acetone bath at room temperature for about 2 hours and vacuum drying the film. The film was then immersed in a toluene bath at room temperature for about 2 hours and vacuum dried.

The maximum pore size of the film as measured by the bubble point method was about 4.6 microns at about 2 psi; the mean pore size of the film as measured by the bubble point method was about 1.3 microns at about 7 psi. Samples of the film, each with an effective surface area of about 3.46 square centimeters, were evaluated for nitrogen flux and water flux at room temperature. The average nitrogen flux was about $$5.0 \times 10^{-1} \frac{cm^3}{cm^2 \ sec \ cmHg}$$

at about 25° C. and the average water flux was about $$37,100 \frac{ml}{m^2 \ hr \ cmHg}$$

at about 25° C.

What is claimed is:

1. A process for preparing a microporous membrane from an unsulfonated poly(etheretherketone)-type polymer comprising the steps of:
   A. forming a mixture comprising:
      (i) at least one unsulfonated poly(etheretherketone)-type polymer, and
      (ii) at least one low melting point crystallizable polymer which is at least partially incompatible with said poly(etheretherketone)-type polymer and which possesses a melting point of less than about (Tm −30° C.), wherein Tm is the melting point of said poly(etheretherketone)-type polymer, and a molecular weight of at least about 400;
   B. heating said mixture to a temperature at which said mixture becomes a fluid;
   C. extruding or casting said fluid under conditions such that a membrane is formed; and
   D. leaching said membrane under conditions such that at least a portion of said low melting point crystallizable polymer is removed from said membrane.

2. The process of claim 1 which further comprises, after extruding or casting but before leaching the membrane, the additional step of quenching or coagulating said membrane under conditions such that said membrane solidifies.

3. A process for preparing a microporous membrane from an unsulfonated poly(etheretherketone)-type polymer which comprises the steps of:
   A. forming a mixture comprising:
      (i) at least one unsulfonated poly(etheretherketone)-type polymer,
      (ii) at least one low melting point crystallizable polymer which is at least partially incompatible with said poly(etheretherketone)-type polymer and which possesses a melting point of less than about (Tm −30° C.), wherein Tm is the melting point of said poly(etheretherketone)-type polymer, and a molecular weight of at least about 400, and
      (iii) a plasticizer comprising at least one organic compound capable of dissolving at least about 10 weight percent of said poly(etheretherketone)- type polymer at the extrusion or casting temperature;

B. heating said mixture to a temperature at which said mixture becomes a fluid;

C. extruding or casting said fluid under conditions such that a membrane is formed; and D. leaching said membrane under conditions such that at least a portion of said low melting point crystallizable polymer, at least a portion of said plasticizer, or combination thereof, is removed from said membrane.

4. The process of claim 3 which further comprises, after extruding or casting but before leaching the membrane, the additional step of quenching or coagulating said membrane under conditions such that said membrane solidifies.

5. The process of claims 1 or 3 which further comprises the additional step of:

F. before leaching, during leaching, after leaching, or a combination thereof, drawing said membrane to increase the flux of fluid through said membrane, while said membrane is at a temperature above about 25° C. and below the melting point of the poly(etheretherketone)-type polymer or the depressed melting point of said mixture.

6. The process of claim 5 wherein said poly(etheretherketone)-type polymer is selected from the group consisting of poly(etherketone), poly(aryletherketone), poly(etheretherketone), poly(etherketoneketone), poly(etheretheretherketone), poly(etheretherketoneketone), poly(etherketoneetherketoneketone), and mixtures thereof.

7. The process of claim 6 wherein said low melting point crystallizable polymer is selected from the group consisting of poly(caprolactones), poly(ethylene oxide), poly(ethylene glycol), poly(oxymethylene), poly(trimethylene oxide), poly(ethylene glycol)methylether, poly(vinyl alcohol), poly(vinyl chloride), crystalline cellulose esters, poly(caprolactone)diol, and poly(caprolactone)triol.

8. The process of claim 7 wherein said plasticizer comprises at least one solvent consisting predominantly of carbon and hydrogen and optionally oxygen, nitrogen, sulfur, halogen, and mixtures thereof, wherein the solvent has a molecular weight of between about 160 and about 450, contains at least one six-membered ring structure, and possesses a boiling point of between about 150° C. and about 480° C.

9. The process of claim 8 wherein said plasticizer comprises at least one solvent selected from the group consisting of diphenic acid, N,N-diphenylformamide, benzil, anthracene, 1-phenylnaphthalene, 4-bromobiphenyl, 4-bromodiphenylether, benzophenone, 1-benzyl-2-pyrrolidinone, o,o'-biphenol, phenanthrene, triphenylmethanol, triphenylmethane, triphenylene, 1,2,3-triphenylbenzene, diphenylsulfone, 2,5-diphenyloxazole, 2-biphenylcarboxylic acid, 4-biphenylcarboxylic acid, m-terphenyl, 4-benzoylbiphenyl, 2-benzoylnaphthalene, 3-phenoxybenzyl alcohol, fluoranthene, 2,5-diphenyl-1,3,4-oxadiazole, 9-fluorenone, 1,2-dibenzoylbenzene, dibenzoylmethane, p-terphenyl, 4-phenylphenol, 4,4'-dibromobiphenyl, diphenylphthalate, 2,6-diphenylphenol, phenothiazine, 4,4'-dimethoxybenzophenone, 9,10-diphenylanthracene, pentachlorophenol, pyrene, 9,9'-bifluorene, a mixture of terphenyls, a mixture of partially hydrogenated terphenyls, a mixture of terphenyls and quaterphenyls, 1-phenyl-2-pyrrolidinone, 4,4'-isopropylidenediphenol, 4,4'-dihydroxybenzophenone, quaterphenyl, diphenyl terephthalate, 4,4'-dimethyldiphenylsulfone, 3,3',4,4'-tetramethyldiphenylsulfone, and mixtures thereof.

10. The process of claim 8 wherein said plasticizer further comprises at least one non-solvent consisting predominantly of carbon and hydrogen and optionally oxygen, phosphorus, silicon, nitrogen, sulfur, halogen, and mixtures thereof, wherein the non-solvent has a molecular weight of between about 120 and about 455 and possesses a boiling point of between about 150° C. and about 480° C.

11. The process of claim 10 wherein said plasticizer comprises at least one non-solvent selected from the group consisting of 1,3,5-triphenylbenzene, tetraphenylmethane, tetraphenylsilane, diphenylsulfoxide, 1,1-diphenylacetone, 1,3-diphenylacetone, 4-acetylbiphenyl, 4,4'-diphenylbenzophenone, 1-benzoyl-4-piperidone, diphenyl carbonate, bibenzyl, diphenylmethylphosphate, 1-bromonaphthalene, 2-phenoxybiphenyl, triphenylphosphate, cyclohexylphenylketone, 1,4-dibenzoylbutane, 2,4,6-trichlorophenol, mineral oil, paraffin oil, petroleum oil, butyl stearate, 9-phenylanthracene, 2-phenylphenol, 1-ethoxynaphthalene, phenylbenzoate, 1-phenyldecane, 1-methoxynaphthalene, 2-methoxynaphthalene, 1,3-diphenoxybenzene, 1,8-dichloroanthraquinone, 9,10-dichloroanthracene, polyphosphoric acid, 1-chloronaphthalene, diphenylether, 1-cyclohexyl-2-pyrrolidinone, hydrogenated terphenyl, dioctylphthalate, 5-chloro-2-benzoxazolone, dibenzothiophene, diphenylsulfide, diphenylchlorophosphate, fluorene, sulfolane, methyl myristate, methyl stearate, hexadecane, dimethyl phthalate, tetraethylene glycol dimethylether, diethylene glycol dibutylether, docosane, eicosane, dotriacontane, 2,7-dimethoxynaphthalene, 2,6-dimethoxynaphthalene, o-terphenyl, 1,1-diphenylethylene, epsilon-caprolactam, thianthrene, silicone oil, and mixtures thereof.

12. The process of claim 10 wherein the amount of poly(etheretherketone)-type polymer in said mixture is between about 10 and about 90 weight percent.

13. The process of claim 12 wherein said membrane is drawn at a temperature of between about 25° C. and about 360° C.

14. The process of claim 13 wherein said membrane is drawn to a draw ratio of between about 1.1 and about 40.

15. The process of claim 14 wherein said fluid is extruded at a temperature of between about 100° C. and about 400° C.

16. The process of claim 15 wherein said membrane is quenched or coagulated at a temperature of between about 0° C. and about 275° C.

17. The process of claim 16 wherein said quench zone comprises a gaseous environment.

18. The process of claim 16 wherein said membrane is leached at a temperature of between about 0° C. and about 250° C.

19. The process of claim 18 wherein said leach zone comprises a liquid selected from the group consisting of toluene, xylene, acetone, water, an acid or alkali aqueous solution, and chlorinated hydrocarbons.

20. The process of claim 12 wherein said membrane possesses a porosity in the range of about 10 percent to about 90 percent.

21. The process of claim 20 wherein the mean pore size of said membrane is in the range of about 5 Angstroms to about 1,000 Angstroms for ultrafiltration, about 0.02 micron to about 10 microns for microfiltration, and about 10 microns to about 50 microns for macrofiltration.

22. The process of claim 21 wherein said membrane possesses a nitrogen flux of at least about $$10^{-6} \frac{cm^3(STP)}{cm^2 \ sec \ cmHg}.$$

23. The process of claim 21 wherein said membrane possesses a water flux of at least about $$1 \frac{ml}{m^2 \ hr \ cmHg}.$$

24. The process of claim 5 which further comprises the additional step of:

G. before leaching, after leaching, before drawing, after drawing, or a combination thereof, annealing said membrane by exposing said membrane to a temperature above the glass transition temperature of the poly(etheretherketone)-type polymer or the poly(etheretherketone)-type polymer and plasticizer mixture and about 10° C. below the melting point of the poly(etheretherketone)-type polymer or poly(etheretherketone)-type polymer and plasticizer mixture for a period of time between about 30 seconds and about 24 hours.

25. The process of claim 7 wherein said poly(etheretherketone)-type polymer has a degree of crystallinity of at least about 10 percent and a melting point of at least about 190° C.

* * * * *